(12) United States Patent
Reynes (10) Patent No.: US 7,810,755 B2
(45) Date of Patent: Oct. 12, 2010

(54) HYDRAULIC DISTRIBUTOR FOR AIRPLANE LANDING GEAR

(75) Inventor: Didier Reynes, Toulouse (FR)

(73) Assignee: Airbus France, Toulouse (FR)

( * ) Notice: Subject to any disclaimer, the term of this patent is extended or adjusted under 35 U.S.C. 154(b) by 630 days.

(21) Appl. No.: 11/689,715

(22) Filed: Mar. 22, 2007

(65) Prior Publication Data
US 2008/0277525 A1 Nov. 13, 2008

(51) Int. Cl.
*B64C 25/22* (2006.01)

(52) U.S. Cl. .............................. 244/104 FP; 244/102 R (58) Field of Classification Search ............. 244/102 R, 244/100 A, 100 R, 100 FP
See application file for complete search history.

(56) References Cited

U.S. PATENT DOCUMENTS

| 2,701,695 | A | * | 2/1955 | Irwin | 244/102 R |
| 3,107,886 | A | * | 10/1963 | Bossler, Jr. | 244/102 R |
| 3,669,387 | A | * | 6/1972 | Lucien | 244/102 SL |
| 4,573,649 | A | * | 3/1986 | Yourkowski et al. | 244/102 R |
| 7,093,795 | B2 | * | 8/2006 | Lindahl et al. | 244/102 R |

FOREIGN PATENT DOCUMENTS

| EP | 1 495 961 A1 | 1/2005 |
| FR | 2 529 859 | 1/1984 |
| FR | 2 875 475 | 3/2006 |
| WO | 04000502 A1 | 12/2003 |

* cited by examiner

*Primary Examiner*—Tien Dinh
(74) *Attorney, Agent, or Firm*—Perman & Green LLP (57) ABSTRACT

A hydraulic distributor 10 assembles in a single body an assembly of hydraulic components that assure the supply of actuators for controlling the movements of the moving elements of an airplane landing gear, for which the movements of the landing-gear legs and of the trap-doors are assured by hydraulic actuators. The airplane includes two or more landing-gear systems, each including a distributor 10 with a single body. The body of each single-body distributor is advantageously created by removing unused parts from a body that can satisfy the needs of all of the landing-gear systems of an airplane, or by addition of extensions onto a minimal body that can satisfy the needs common to all of the landing-gear systems of the airplane.

11 Claims, 9 Drawing Sheets

HYDRAULIC DISTRIBUTOR FOR AIRPLANE LANDING GEAR

The present invention relates to airplane landing gear using hydraulic energy to assure the retraction and extension movements of the elements of the landing gear and more particularly to the hydraulic distribution used for these landing gears.

For reasons of performance and aerodynamics, the majority of modern airplanes are equipped with landing gears that can be retracted into recesses or gear housings during flight, and extended for take-off and landing.

Most often, the movements of moving parts of landing gears are assured by means of hydraulic actuators, i.e., using a hydraulic fluid under pressure.

Although other types of actuators can be used, hydraulic actuators remain the most often used for this application due to the favorable balance of force that can be obtained with such actuators with regard to their reliability, the volume that they occupy, and their mass.

Moreover, when compared to other systems that are able to use hydraulic energy, airplane landing gears have particular constraints for the design and embodiment of the hydraulic control circuits that assure their movements.

Thus, landing gears are generally associated with trap-doors or doors that close up the gear housings and that assure the aerodynamic continuity of the fuselage or of the wing when the gear is in the retracted position, but must open during movement of the gear and close again, at least in some cases, when the gear is in the extended position.

Of course, these gears and trap-doors must be moved according to perfectly defined sequences in order to prevent interference among the different elements during movement.

The moving elements, gears and trap-doors, are often associated with locking devices so that each moving element is kept in the correct position in the retracted position if or when the hydraulic pressure drops in the actuators that assure the movements of said elements between their retracted and extended or open and closed positions.

When the plane is on the ground, the gears are normally in the extended position, and certain trap-doors need to be open and closed by the airplane ground maintenance crew.

These usual operations, pursued for reasons of monitoring or maintenance, are generally performed with the engine shut down, without normal supply of the hydraulic circuits for opening the trap-doors, and in this case, the trap-doors are unlocked and opened manually with or without the use of auxiliary hydraulic power generation.

One of the possibilities offered by hydraulic systems in order to assure movements of airplane landing gears is the implementation of the safety requirement concerning extension "by gravity", i.e., in the absence of the power that is input to the actuators when the airplane is in flight.

In order to take this requirement into account, in hydraulic-control landing gears, generally mechanical controls are used that act directly on the hydraulic distributors and on the locks to permit the free circulation of the hydraulic fluid in the actuator circuits so that the different actuators and trap-doors no longer oppose the dropping of the landing gears under their own weight.

All of these constraints, and the fact that in the same airplane the different gears, principal wing gears, principal fuselage gears, and auxiliary gears (front landing gear, in general), which are grouped into landing-gear systems relative to monitoring and controlling them, comprise actuators, trap-doors and locks in very variable quantities and with very variable installation conditions, lead to the positioning of numerous pieces of hydraulic equipment associated with control circuits for landing gears near each gear, for example, in the gear housings of the landing-gear systems concerned, according to complex arrangements, due to the amount of equipment, the number of connections between these pieces of equipment, and possible connections to mechanical controls.

This situation, non-optimal in terms of mass and installation complexity, also generates the risk of hydraulic leaks and involves complex maintenance operations when an operation on the hydraulic equipment is necessary.

Figure 1:
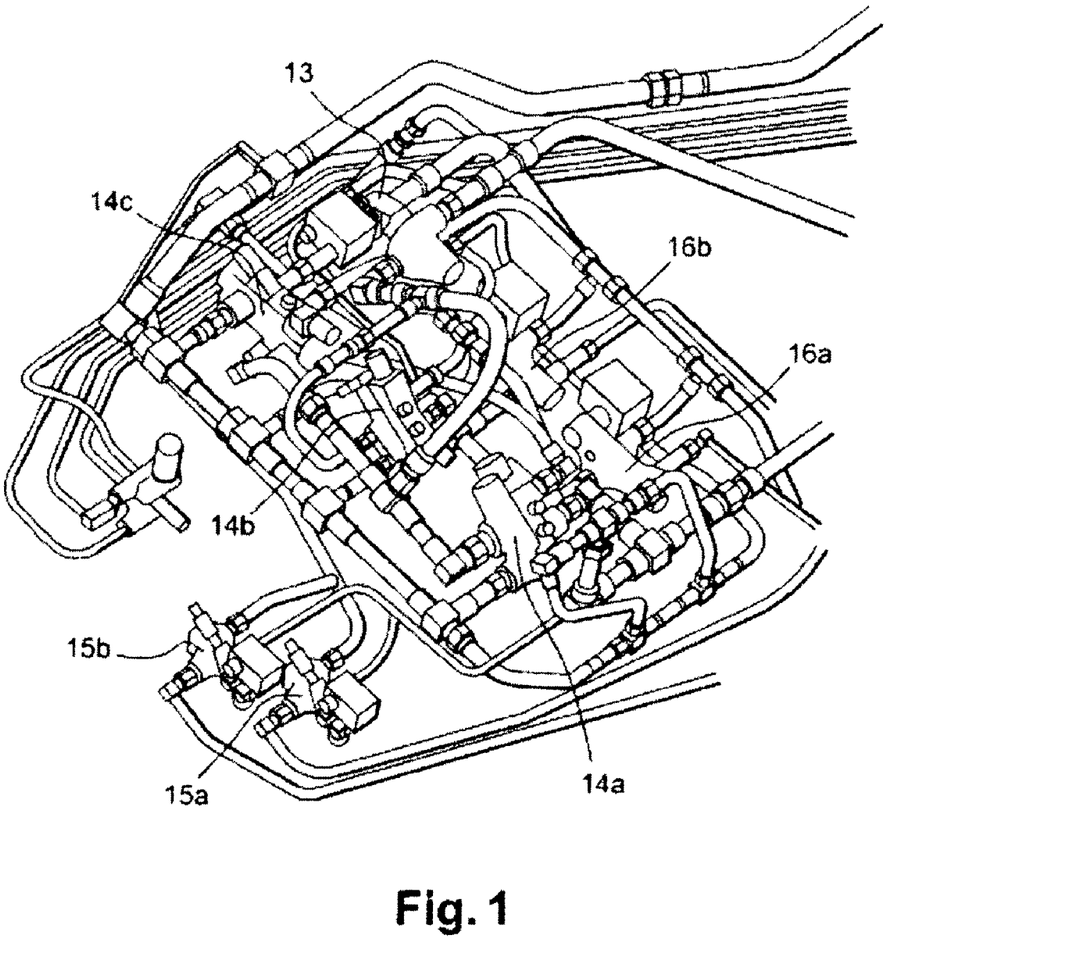
FIG. 1, which has already been mentioned, shows an example of embodiment according to known methods and means of a hydraulic control assembly for a principal airplane landing-gear system.

FIG. 1 shows an example of installation of an assembly of hydraulic equipment for a landing-gear control circuit for a wide-bodied civilian airplane. In this example, a relatively compact installation is realized by means of employing hydraulic equipment piloted by means of electric control components. However, the number of hydraulic connections is high, the space occupied by the hydraulic assembly is large, accessibility is reduced and optimization relative to the airplane leads to defining different installations for each landing-gear system using hydraulic components that differ in number.

In order to introduce a well-performing and economic solution to the problem of hydraulic distribution for control of the movements of landing-gear systems of an airplane, the present invention proposes a hydraulic distributor that assembles in a single body all the hydraulic components necessary for controlling said movements.

Thus, for an airplane landing-gear system that has at least one landing-gear leg that moves between two positions by means of a hydraulic actuator, and at least one hatch that moves between two positions and is driven by means of a hydraulic actuator, the hydraulic actuators of the at least one landing gear and of the at least one hatch are supplied with hydraulic fluid by a single-body hydraulic distributor that comprises an assembly of hydraulic elements which assure the supply to the actuators for control of the movements of the at least one leg of the landing gear and of the at least one hatch, and that comprises hydraulic connections between these components for the functioning of the distributor. This single-body distributor permits a compact installation of the different components, and by eliminating the majority of hydraulic connections, improves the reliability of landing-gear systems while reducing the production costs for the control system for each landing-gear system as well as the mass of this system.

In particular, in order to satisfy the operation of a landing-gear system for the different modes of operation: normal, emergency and maintenance, the single-body distributor has at least one selection valve for the control of the at least one hydraulic actuator assuring the movements of the at least one leg of the landing gear, at least one selection valve for control of the at least one hydraulic actuator assuring the movements of the at least one hatch, and at least one valve that can inhibit the forces exerted by the at least one actuator of the at least one hatch in order to permit movement of the hatch on the ground under the effect of external forces.

Advantageously, the single-body distributor also comprises at least one valve that can inhibit the forces exerted by the hydraulic actuators of the at least one gear and of the at least one hatch in order to permit movement of the gear under the effect of gravity.

Advantageously, it also comprises an isolating valve that can prevent the inflow of pressurized hydraulic fluid into the hydraulic components of the distributor and the actuators which said distributor controls.

Due to the requirements of landing-gear systems of specific architecture, the single-body distributor comprises at least two separate selection valves to assure the separate supply of the at least one first actuator for the at least one first hatch articulated to a fixed structure of the airplane and of at least one second actuator for at least one second hatch articulated onto the at least one first hatch.

Preferably, to optimize the volume of the hydraulic distributor body, the valves are positioned in the single body of the distributor along roughly parallel orientations.

Preferably, the hydraulic connections between the hydraulic components of the distributor are made by straight channels and these straight channels are made by drillings or boreholes from the outer surface of said body.

The corresponding holes at the ends emerging into the channels at the outer surface of said body are closed by attached elements when said holes do not correspond to an inlet or outlet for hydraulic fluid channels.

Advantageously, when the distributor comprises a two-stage selector, said two stages are integrated into the single body to obviate the need for external hydraulic connections.

The hydraulic components of the single-body distributor, depending on the case, employ mechanical control means that converge on the single-body distributor, or they employ electrical, electromagnetic control means, or control by means of motors that are attached to the distributor body.

In order to improve the operational availability of an airplane and to reduce its mass, when said airplane has at least two landing-gear systems, each landing-gear system comprising at least one landing-gear leg that can be moved between two positions by means of a hydraulic actuator and at least one hatch that can be moved between two positions and is driven by means of a hydraulic actuator, said hydraulic actuators for each landing-gear system are supplied with hydraulic fluid by a single-body hydraulic distributor that comprises an assembly of hydraulic components that assure the supply of the actuators to said landing-gear system for control of the movements of the at least one landing-gear leg and the at least one hatch, and which comprise hydraulic connections between these components for the functioning of the distributor.

In particular, to limit the number of types of single-body distributors or at least to limit the variations of these from one distributor to another of the airplane, the single-body distributor body of each airplane landing-gear system is made starting from a virtual hydraulic diagram corresponding to a maximal body for the single-body hydraulic distributor that can satisfy the control of movements for each of the at least two landing-gear systems of the airplane.

According to one mode of implementation of the invention, the single-body hydraulic distributors of the at least two airplane landing-gear systems are identical, in order to minimize the number of references for parts and the number of replacement pieces of equipment to keep in stock.

According to another mode of implementation, the single-body hydraulic distributors for each of the at least two landing-gear systems have identical bodies and each distributor is equipped with at least the components necessary for the control of movements of the landing-gear system for which it is designed, so that only one model of the body is produced industrially, but without additional cost due to components that are not used in the distributors employed by each landing-gear system of the airplane.

According to another embodiment of the invention, at least one single-body hydraulic distributor for the airplane landing-gear system is made with a body obtained from the maximal body for the single-body distributor by elimination of the parts of the maximal body that are not used by the landing-gear system concerned.

In an alternative solution to limit the number of types of single-body distributors, or at least to limit variations from one distributor to another in the airplane, the single-body distributor bodies of each of the at least two landing-gear systems comprise a common part, or minimal body, corresponding to the identical or similar hydraulic components that are common to the at least two landing-gear systems.

Advantageously, the single-body distributor body for at least one of the landing-gear systems is obtained by adding at least one specific body element onto the minimal body to fulfill its own requirements.

In order to optimize the industrial process as well as manufacturing costs for distributors for landing-gear systems of an airplane, the different solutions proposed for creating distributors are advantageously combined and single-body distributor bodies of each of the landing-gear systems are obtained from a reference body, for at least one of the landing-gear systems, by inhibition of at least one part of the reference body not used by the landing-gear system concerned, and/or by elimination of a part not useful to the landing-gear system concerned and/or by introduction of a body part necessary for the landing-gear system concerned.

The detailed description is made with reference to the drawings.

In a known manner, landing gears and the associated trapdoors whose extension and retraction and opening and closing movements must be controlled are moved around by actuators whose force is generated by two-way hydraulic cylinders. In this type of cylinder, when a first chamber is supplied by pressurized fluid, the shaft of the cylinder is pushed back by the effect of the pressure and a second chamber is emptied of the fluid that it contains via the return circuit with which it communicates. The supplies of said first and second chambers are reversed to change the direction of action of the cylinder.

This type of functioning is well known and widely used with hydraulic actuators.

In order to realize this reversal of supply and change the direction of action of the cylinder, generally selectors are used that, by means of distribution slides and associated openings, place one or the other of the actuator chambers in communication with an intake for pressurized fluid according to the desired direction of action of the cylinder at the same time that the chamber which is not subjected to the pressurized fluid is placed in communication with the return circuit.

Such selectors and their operations associated with two-way cylinders are known. The fluid distribution means, such as slides, can be driven either directly by mechanical means or, in the most recent devices when safety requirements permit it, by electrical means, for example electromagnetic coils or motors. A distributor can also comprise two or more hydraulic stages. For example, a first distributor stage using low-power electromagnetic coils permits applying a hydraulic pressure on a second stage in order to move a hydraulic slide whose dimensions are adapted to the hydraulic fluxes necessary for the good functioning of the actuators.

In order to assure a correct functioning of the landing-gear systems during these movements, other means are associated with the selectors and actuators. Thus a hydraulic control circuit for a landing gear comprises, for example:
  one or more additional valves assuring the functioning of the system in particular modes;
  one or more hydraulic valves or fuses;
  one or more isolation valves;
  one or more filters, etc.

Each element is arranged in the hydraulic circuit to respond to functioning requirements, normal or otherwise, and to the safety requirements of the hydraulic control circuit and of the landing gear concerned.

Figure 3:
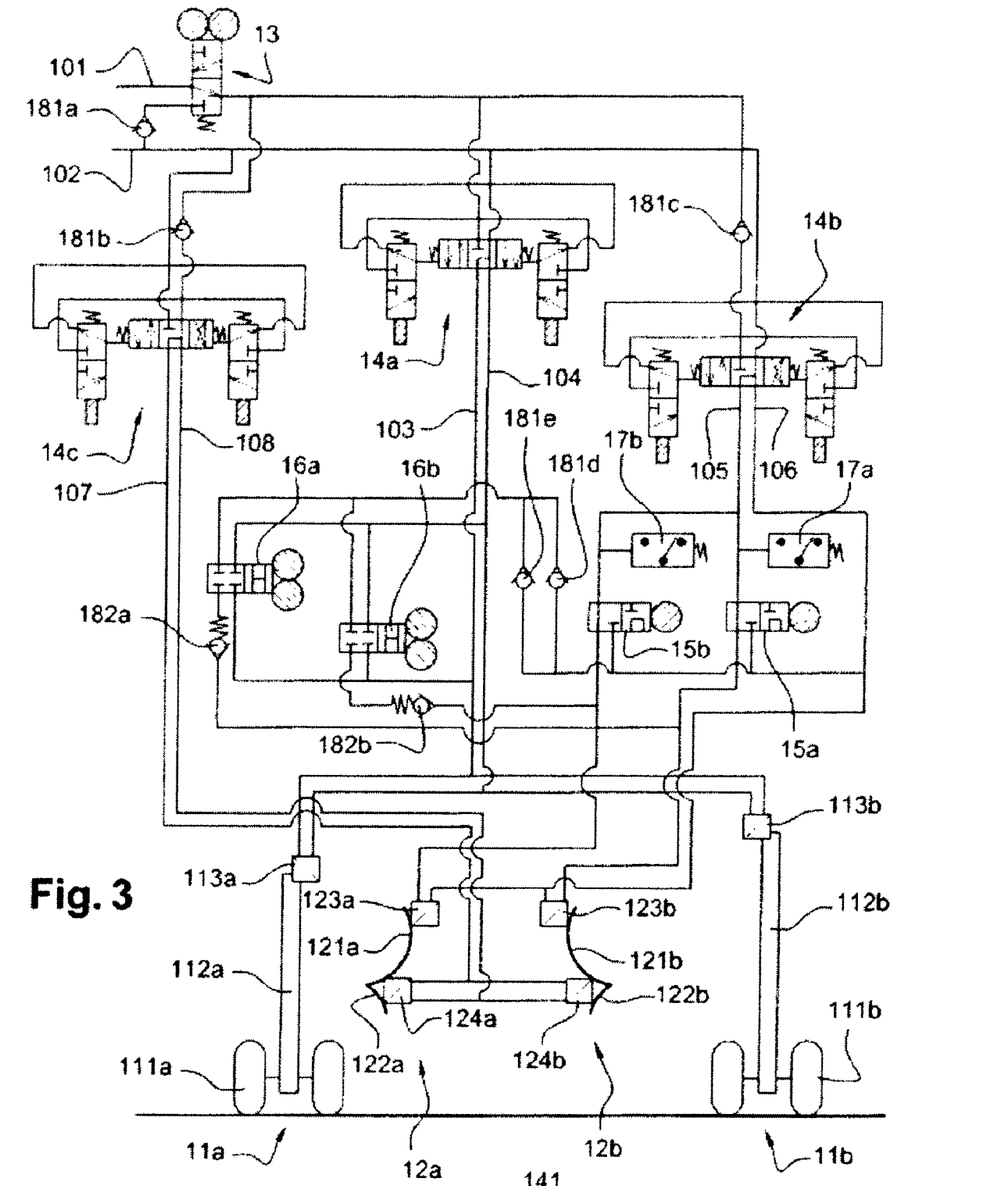
FIG. 3 shows a functional diagram of a hydraulic control system for a principal airplane landing-gear system.
Figure 3A:
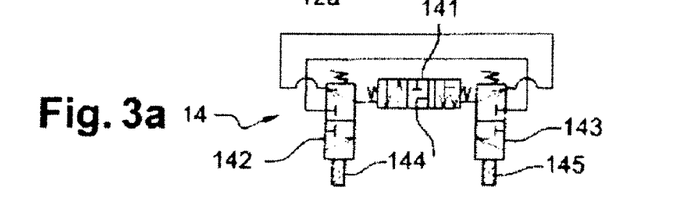

FIG. 3 shows one example of the functional architecture of a hydraulic control system for a landing-gear system comprising two gears 11a, 11b. Each gear comprises at least one wheel assembly 111a, 111b, one landing-gear leg, 112a, 112b, a hatch assembly 12a, 12b for the gear hatch to close the corresponding gear housing (not shown). A hatch assembly 12a, 12b in the present example comprises at least two trap-doors. A first hatch, called the principal hatch, 121a, 121b, respectively, is articulated to the airplane structure and is moved by means of hydraulic actuators, 123a, 123b, respectively. A second hatch, called the secondary hatch, 122a, 122b, respectively, is articulated onto the principal hatch. In the case considered, each secondary hatch is moved relative to the corresponding principal hatch, 121a, 121b, by means of specific hydraulic actuators, 124a, 124b, respectively. The hydraulic circuit of FIG. 3 has a principal conduit 101 by which the pressurized fluid arrives and a drain conduit 102 by which the fluid returns toward the hydraulic pressure generation and distribution means (not shown).

Conduits 101 and 102 are connected to a first selector 14a that supplies two-way, pressurized hydraulic cylinders 113a, 113b by conduits 103, 104, and these cylinders assure the movements of landing gears 11a and 11b.

Conduits 101, 102 are also connected to a second selector 14b which in turn is connected by conduits 105, 106 to two-way hydraulic cylinders 123a and 123b that assure the movements of principal trap-doors 121a, 121b of the gear housing. In a similar manner, conduits 101 and 102 are also connected to a third selector 14c, which is itself connected by conduits 107, 108 to two-way hydraulic cylinders 124a and 124b that assure the movements of secondary trap-doors 122a and 122b articulated to the principal trap-doors.

Selectors 14a, 14b and 14c are two-stage in the example of FIG. 3. As illustrated in detail (a) of FIG. 3, a two-stage selector 14 comprises a principal selector 141 whose distribution slide is moved by means of the hydraulic pressure carried from one side or the other of the slide by secondary selectors 142 and 143.

The distribution slides of said secondary selectors are moved, for example, by means of electromagnetic actuators 144, 145, such as coils driving a magnetic core.

An insulating valve 13 placed on principal conduit 101 permits depressurizing the hydraulic circuit assembly associated with the landing-gear system concerned, which is often desirable when the moving elements are not in movement and in locked positions during the long periods of flight during which the landing-gear systems are not used, or when the plane is on the ground.

In order to permit the extension of landing gears 11a, 11b of the landing-gear system by gravity, valves 16a, 16b assure the communication of the chambers of the two-way cylinders 113a and 113b of the gears and trap-doors 123a and 123b. Finally, in order to permit opening trap-doors 12a, 12b on the ground by maintenance crews, valves 15a, 15b place in communication the chambers of the two-way cylinders 123a, 123b, respectively, of trap-doors 12a, 12b, without effect on the cylinders 113a, 113b of the gears.

The use of two independent valves each acting on the cylinders of a hatch assembly is necessary so that each hatch assembly 12a and 12b can be opened and closed on the ground independently of one another. Hydraulic pressure detectors 17a and 17b also permit the control circuits to act on valves 15a, 15b in order to prevent undesired movements of trap-doors by inhibiting certain maneuvers that could be dangerous for the maintenance crews.

Finally, low-pressure non-return valves 181a, 181b, 181c, 181d, 181e and high-pressure non-return valves 182a, 182b are positioned in certain conduits to prevent the flow of hydraulic fluid in undesired directions during certain functioning modes of the circuit.

In the diagram of FIG. 3, the two-way hydraulic cylinders, as well as the kinematics of the landing gears and trap-doors are not detailed, since their principles are well known.

Likewise, the locking devices for the moving elements that can be driven by hydraulic or electric or mechanical means are not shown.

In the example illustrated in FIG. 3, all of the selectors and valves are controlled electrically, but the electric circuits associated with these controls are not shown.

FIG. 1 shows a conventional example of embodiment of a hydraulic assembly for control of an airplane landing-gear system conforming to the functional diagram presented in FIG. 3. The hydraulic components of the circuit such as selectors 14a, 14b, 14c or valves 13, 15a, 15b, 16a, 16b, are connected by means of pipelines in which hydraulic fluid circulates. The structure of the airplane, the supports and the electrical control bundles are not shown.

Figure 2:
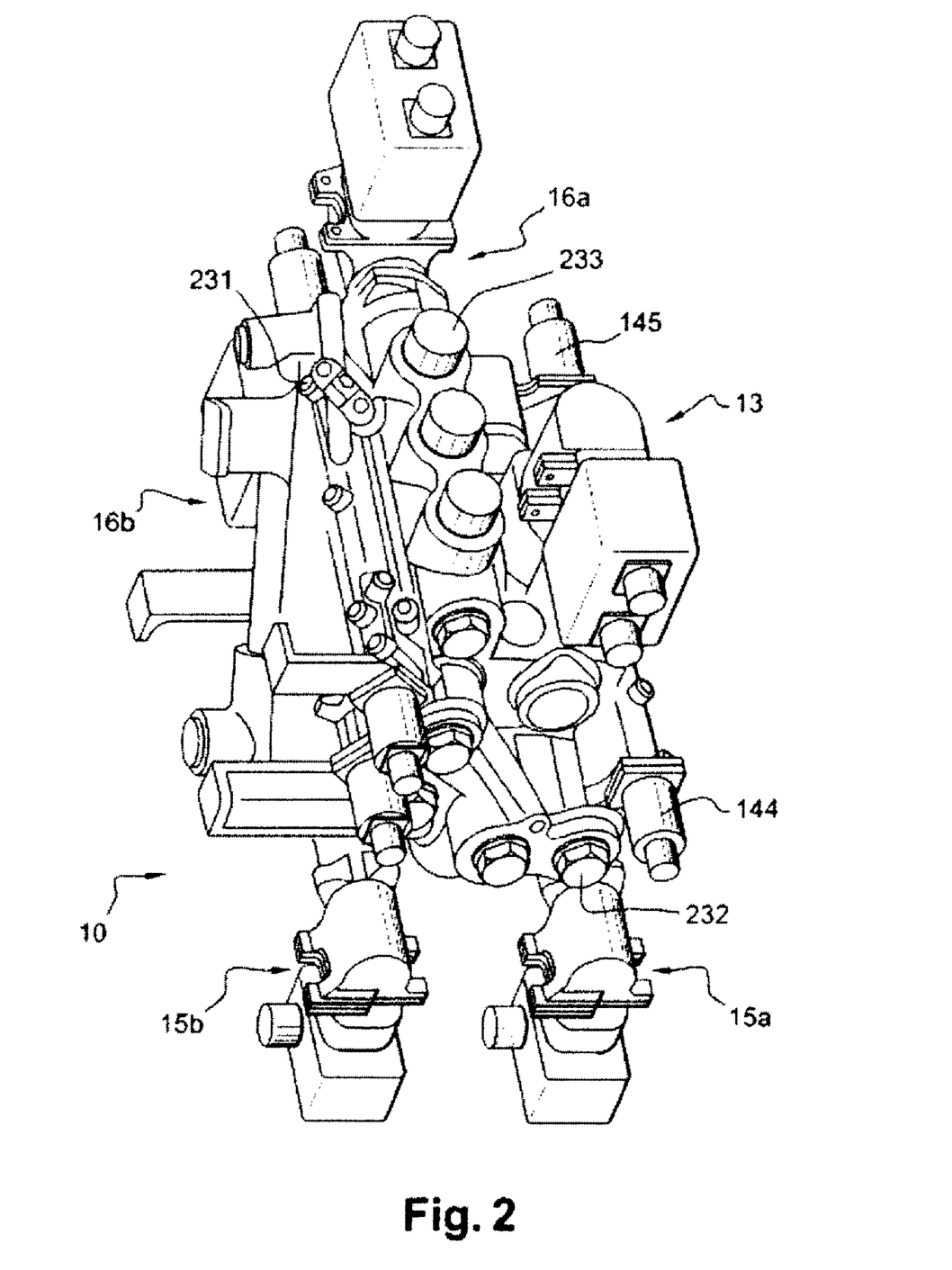
FIG. 2 is a perspective view of a complete hydraulic distributor according to the invention for an airplane landing-gear system.
Figure 7:
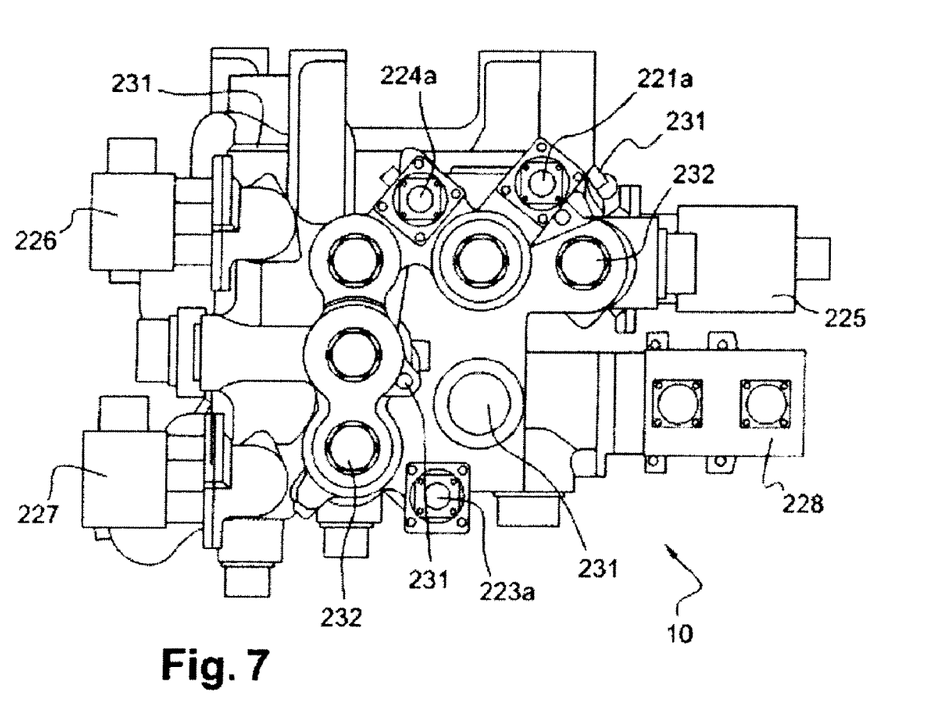
FIG. 7 shows an end view of the distributor corresponding to the body of FIG. 6 after equipping it.

The hydraulic distributor 10 for the landing-gear system according to the invention, which is shown assembled in FIGS. 2 and 7, groups in a single body all of the essential hydraulic components used in the hydraulic control circuit for a landing-gear system.

Figure 6:
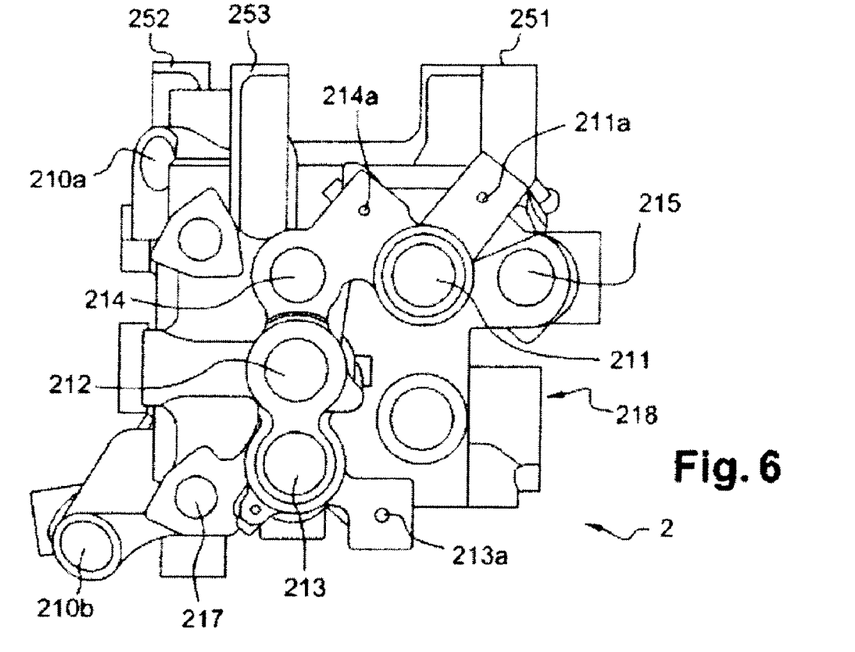
FIG. 6 shows an end view of the distributor body according to the invention.

A single body 2 presented in FIG. 6, generally of metal, comprises recesses that can receive the different internal elements to fulfill the functions assured by conventional equipment, in particular the elements of the hydraulic part. The body comprises boreholes corresponding to each hydraulic component to receive the selector slides and valves of the circuit. For the hydraulic circuit of FIG. 3, the body comprises the boreholes:
  211, 212, and 213 for the 3 principal distributors 14a, 14b and 14c, respectively (first stage);

for the 6 secondary distributors (second stages of each of the principal distributors), 211*a*, 213*a* and 214*a* on one face of block 2 (face visible in FIG. 6) and 211*b*, 213*b* and 214*b* on the opposite face of block 2;

214 and 215 for the two selection valves for the extension of the gears by gravity, 16*a* and 16*b*, respectively;

216 and 217 for the two valves for manual opening of the trap-doors, 15*a* and 15*b*, respectively.

218 for isolation valve 13 of the circuit of the landing-gear system;

for the non-return valves, 210*a* and 210*b* on the visible face of block 2 shown in FIG. 6.

Figure 4:
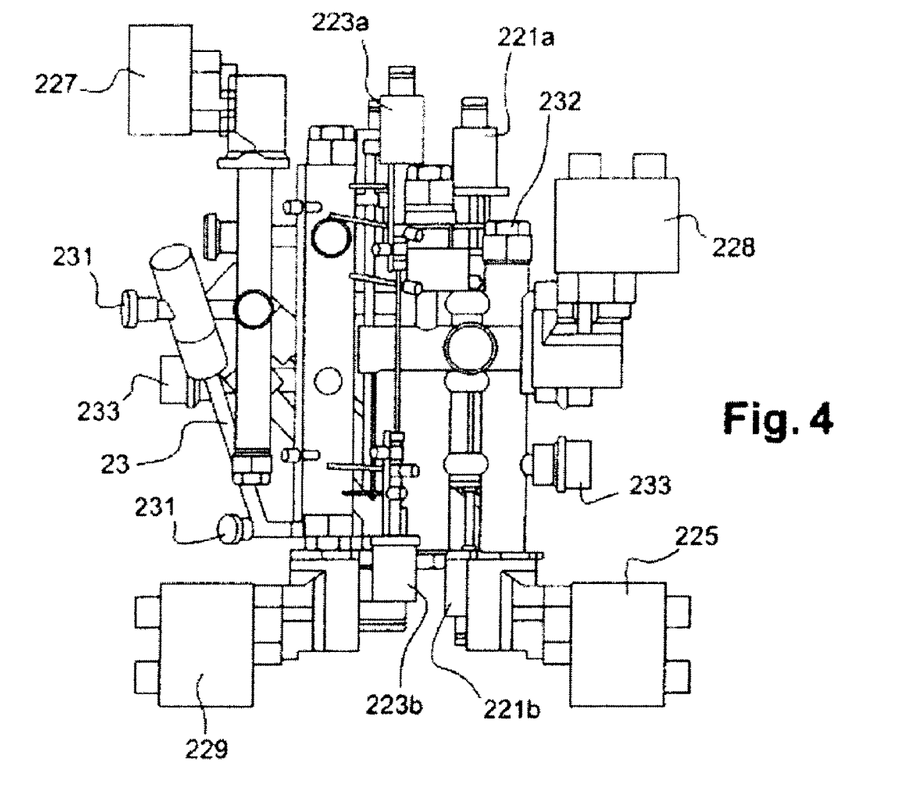
FIG. 4 and FIG. 5 show views of a distributor according to the invention without representation of the substance of the distributor body, which shows the drillings and boreholes of the distributor as well as the elements attached on the distributor body.
Figure 5:
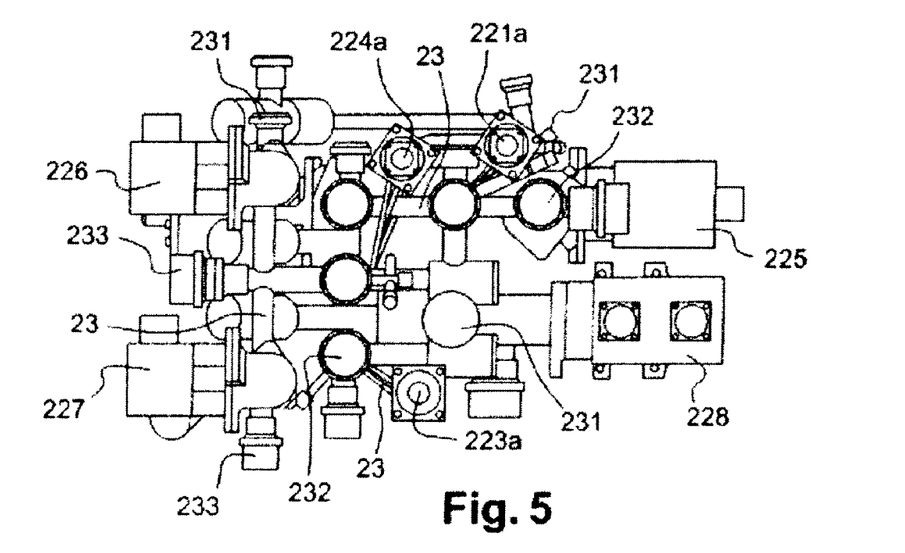

The hydraulic connections between the different components of the circuit are created by channels 23, notably shown in FIGS. 4 and 5, in which the substance of the body is not shown, created in body 2 according to the functional diagram.

Advantageously, these channels 23, each with diameters adapted to the desired flow rates, are made, for practical reasons, by straight drillings emerging at the outer surface of body 2.

Each hole made on the surface of the body by a channel drilling thus created may or may not correspond to a functional opening.

As a function of the particular case, the opening at the surface of body 2 is:

either closed by a fixed sealing piece 231, for example crimped on, when the hole is not used after a channel is made;

or closed by a removable piece 232, for example a screwed-on element, when the hole corresponds to a borehole designed to receive a moving element that can be removed, for example a distributor slide;

or arranged to permit mounting an external actuator, for example a magnetic-coil electric actuator 221*a*, 221*b*, 223*a*, 223*b*, 224*a*, 224*b* or an electrical motor 225 to 229 designed to move a distributor slide, which will be fastened in an appropriate manner to the surface of the body (in a manner similar to that used with known distributor bodies);

or adapted by an attached or machined end fitting 233 for connecting a hydraulic pipeline for outlet or inlet of fluid.

In order to arrive at a body 2 of dimensions that are as small as possible, the elements of the different hydraulic components are advantageously arranged so as to be as close as possible to one another while preserving the necessary thickness of the body substance necessary to resist the hydraulic pressures that come into play.

Advantageously the elements having the largest dimensions, such as the slides of the first stages of distributors 14*a*, 14*b*, 14*c* and the slides of the various valves 13, 15*a*, 15*b*, 16*a*, 16*b*, due to the hydraulic connections between these elements and the flow rates of the hydraulic fluid necessary to assure the functioning of the gear and hatch actuators, are arranged in the central part of the body, essentially along parallel axes, the distribution slides themselves having elongated shapes.

As shown in FIGS. 4 and 5, boreholes and various drillings 23 are made in body 2 in order to permit the circulation of fluid conforming to the circuit defined by the diagram of FIG. 3.

In these FIGS. 4 and 5, the different holes and boreholes are shown and the substance of body 2 is not shown. The attached elements on the outer surface of body 2, the electromechanical or electromagnetic actuators, fixed sealing pieces 231, removable pieces 232 and end fittings 233 are also shown.

Once the machinings, boreholes and drillings are made in distributor body 2, advantageously by beginning with a metal blank, stripped body 2 is equipped with the different internal and external elements to arrive at distributor 10 such as is shown in FIG. 2, which can be installed in an airplane. Advantageously, body 2 has structural extensions 251, 252, 253 in order to assure its fastening to the airplane structure.

As a general rule, an airplane 5 comprises several landing-gear systems.

Civilian transport planes more or less systematically comprise:

a principal landing-gear system attached to the wing or to the fuselage which generally comprises two gear legs;

an auxiliary front landing-gear system 8, generally with a single gear leg.

When the mass of the airplane is great, the constraints associated with admissible loads for landing runways lead aeronautic designers in certain cases to equip the plane with a more or less complex second principal landing-gear system 7, comprising one gear leg in the axis of the plane or two gear legs on either side of the fuselage.

Figure 8:
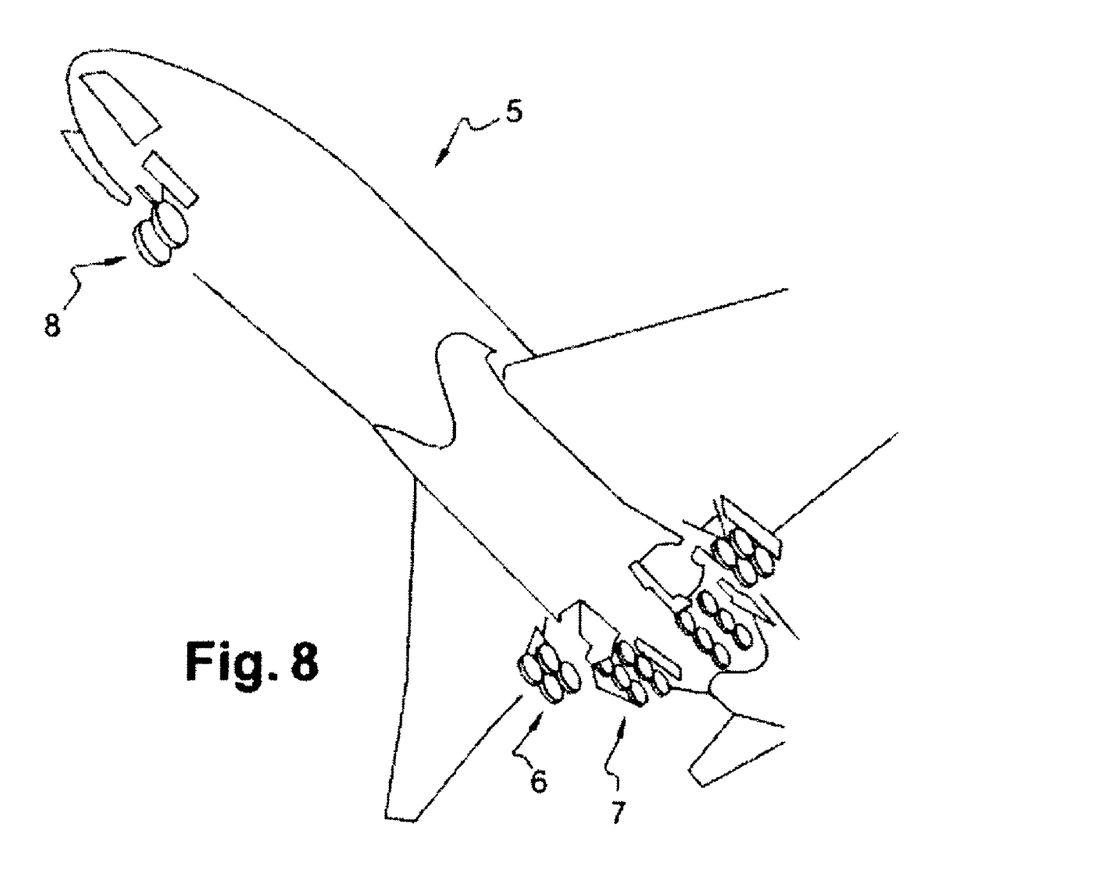
FIG. 8 shows the bottom of a wide-body airplane having extended gears illustrating an airplane configuration having two principal landing-gear systems and an auxiliary front landing-gear system.

An airplane having a configuration with two principal landing-gear systems 6, 7, with two landing gear legs each is presented in FIG. 8.

Each landing-gear system is roughly symmetrical with regard to the vertical plane of symmetry of the airplane, and, in the general case, each landing-gear system is provided with a hydraulic control assembly adapted to its configuration, but which, in its principles, conforms to the hydraulic control system that has just been described for the embodiment of a hydraulic distributor integrating all the hydraulic components of the control circuit.

This configuration of the landing-gear systems is probably the most widespread, but in theory, the number and the position of the landing-gear systems can be very variable, and this is true also for their control systems; for example, two landing-gear systems can use the same distributor for their hydraulic supply.

Thus, the airplane will generally comprise two or three hydraulic control assemblies for landing-gear systems, depending on whether it is equipped with two landing-gear systems (principal landing-gear system 6 and auxiliary landing-gear system 8) or three landing-gear systems (two principal landing-gear systems 6 and 7 and one auxiliary landing-gear system 8).

Although each hydraulic control assembly of the landing-gear systems overall responds to the same objectives, it is nevertheless necessary to consider that each landing-gear system has particular characteristics. A front landing-gear system 8 generally comprises one gear leg, while a principle landing-gear system 6 or 7 most often has two legs, with one gear leg to the right and the other to the left of the vertical plane of symmetry of the airplane. For each landing-gear system, the number of closing trap-doors for the gear housing and their operating modes are also variable.

In practice, the control circuits of these different landing-gear systems comprise elements similar to, but whose number can be different from, those of the circuit already analyzed in FIG. 3, which particularly corresponds to a principal fuselage landing-gear system 7.

A hydraulic distributor according to the invention can be defined to replace the complex assembly of isolated pieces of equipment connected by pipelines for each landing-gear system of the airplane.

In order to improve the industrial process, a single distributor body 2 is made so that it is possible to create from this a distributor for each of the landing-gear systems of the airplane, in order to correspond to the different functional diagrams of the hydraulic control system for each of the landing-gear systems, with the minimum of differences between the distributors designed for the different landing-gear systems.

For this purpose, a virtual hydraulic control system diagram for a landing-gear system is defined. This virtual diagram corresponds to the envelope for the hydraulic control systems of all the landing-gear systems of the airplane, both for the hydraulic components and for the connections between these components.

A single-body distributor made on the basis of the diagram of this virtual hydraulic system is capable of fulfilling the functions necessary for the control of each landing-gear system of the same airplane.

According to the compromise made between production costs, the number of references for replacement parts and the mass, one of the following choices is applied:
1. A distributor 10 identical at every point is used for each landing-gear system of the airplane; the unused openings of a given landing-gear system are then sealed by removable pieces for the landing-gear system concerned;
2. Each landing-gear system uses a distributor having the same body 2 but only essentially comprising the components necessary for the landing-gear system concerned and the unused openings are closed by removable pieces. In this case, the drillings and boreholes not necessary for a given landing-gear system need not be made for the hydraulic distributor designed for this landing-gear system.
3. Each landing-gear system uses a specific distributor whose body 2 is adapted to the landing-gear system concerned employing a common base for all of the landing-gear systems of the airplane.

The first choice permits using the same reference for the distributor in each of the landing-gear systems, but since some distributor parts are not used in some cases, this solution can generate additional costs and a mass penalty.

The second choice permits reducing the penalties of the preceding choice, but it imposes the managing of particular replacement distributors for each landing-gear system.

The third choice has the advantage of reducing the total mass of the distributors as much as possible.

In the particular case of the example presented, the hydraulic control system of FIG. 3 for principal fuselage landing-gear system 7, due to its complexity, comprises all the components necessary for the distributors of other landing-gear systems and it is therefore not necessary, in this case, to add additional hydraulic components to them to make up the virtual distributor diagram.

Figure 9:
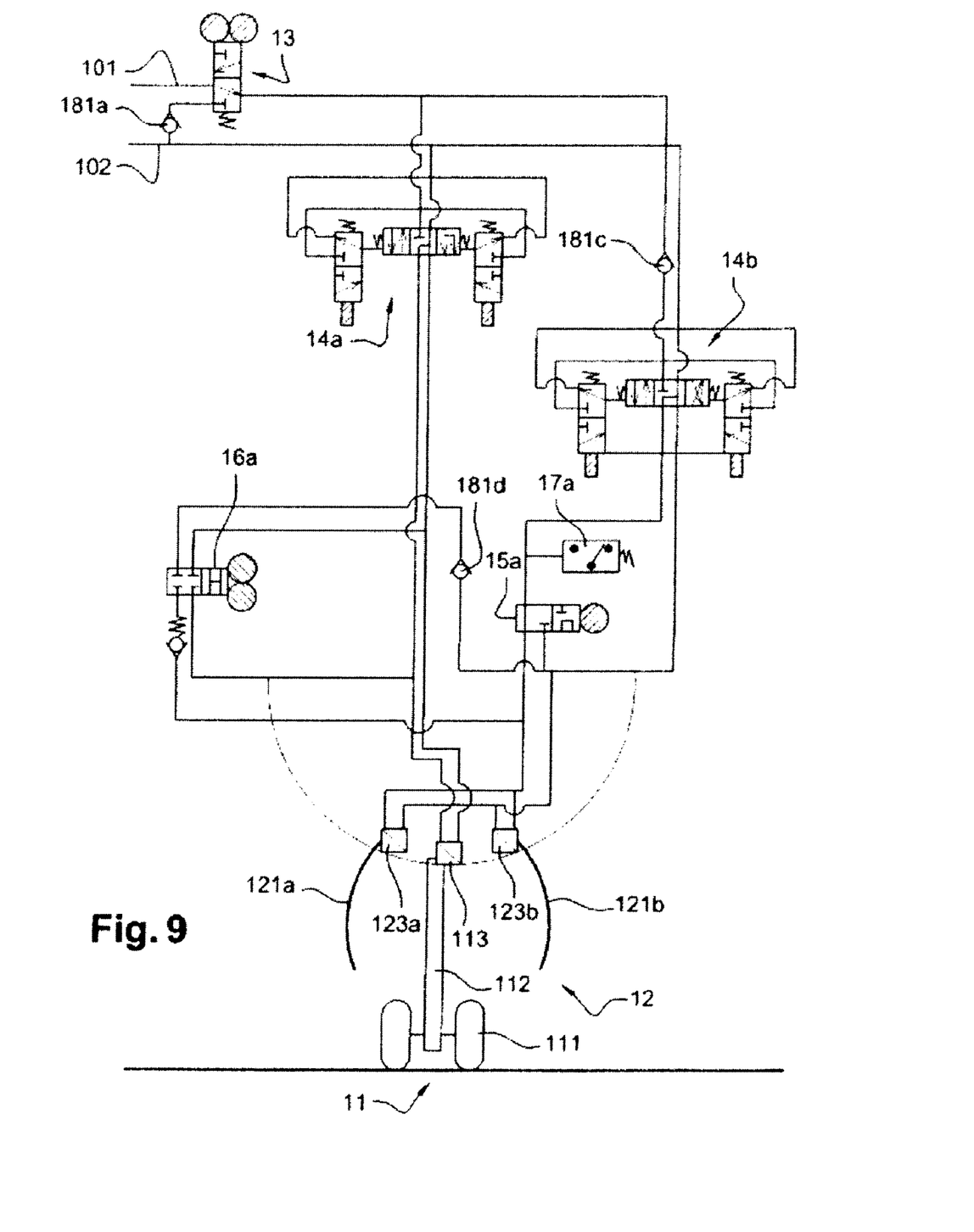
FIG. 9 and FIG. 10 show functional diagrams of the hydraulic control systems for an auxiliary front landing-gear system and for a principal landing-gear system of an airplane wing.
Figure 10:
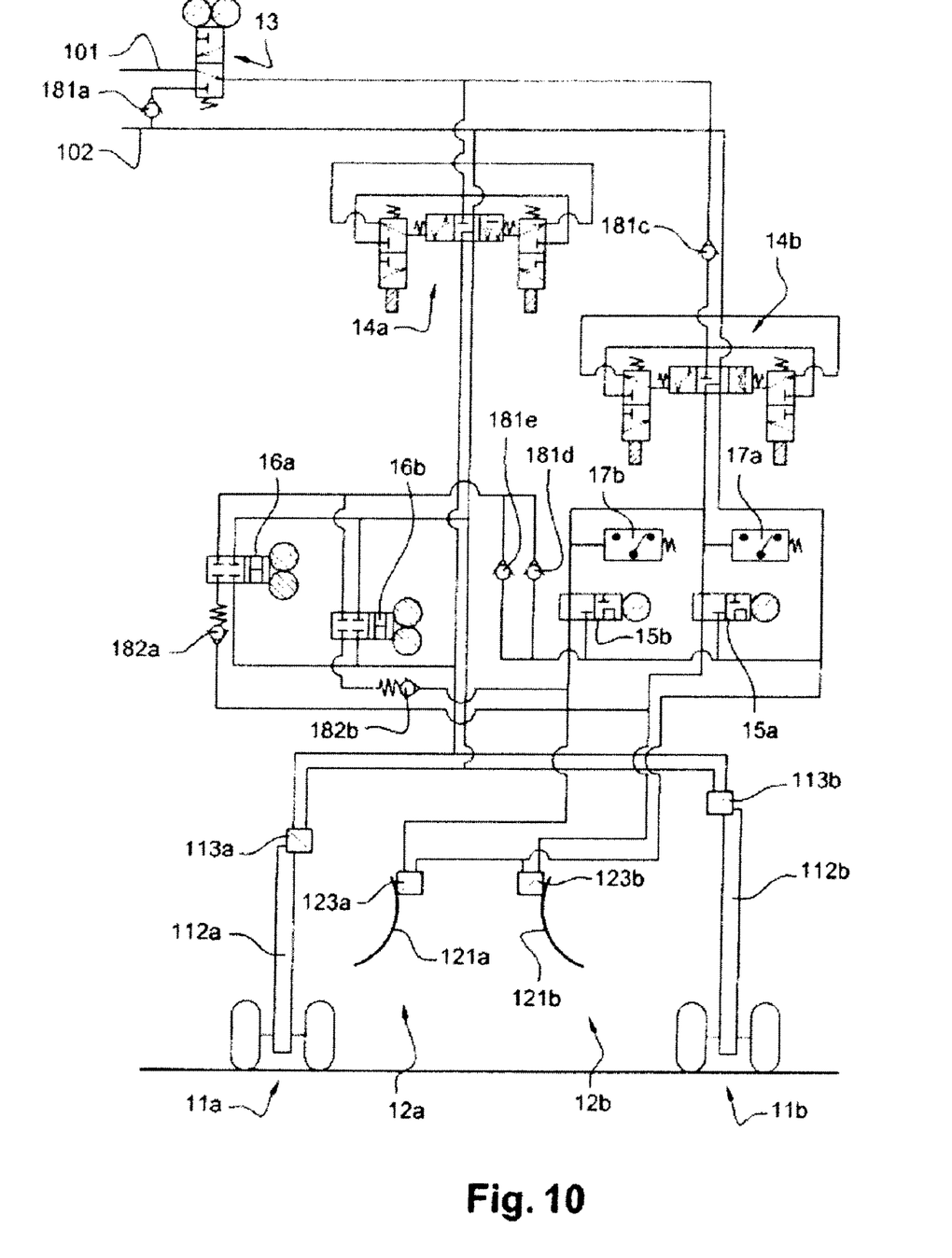

The other two circuits of FIGS. 10 and 9, respectively, corresponding to principal wing landing-gear system 6 and front landing-gear system 8, are obtained from the circuit of FIG. 3 of principal landing-gear system 7 by the removal of certain hydraulic components and the corresponding connections.

In order to implement the option of the third choice given above, the hydraulic components of the virtual diagram that are common to all of the hydraulic control circuits of the landing-gear systems for which single-body distributors should be made are identified. These components, called common components, are arranged in a single body in order to constitute a minimal distributor conforming to the distributor according to the invention described previously.

Common component can be broadly understood not only as a component that can be identical at all points, but also a component that could be chosen as identical for realizing similar functions, as long as the mass penalty or cost is acceptable, or a component that is only differentiated by elements that are easily modified regarding industrial consideration. By way of illustration of an easily modifiable element, we can cite the stiffness of a spring on a non-return valve or the arrangement of openings on a distribution slide of a selector or the diameter of the borehole of a distribution slide.

The minimal single-body distributor alone may not correspond to the needs of any of the landing-gear systems, since each landing-gear system can also comprise components that are unique to them, but this minimal distributor is nevertheless usable by all landing-gear systems.

In a final step, hydraulic components particular to each landing-gear system, in some cases grouped by subassemblies common to a portion of airplane landing-gear systems, are combined with the minimal distributor in order to make up distributors conforming to the single-body distributor according to the invention, but adapted to each landing-gear system.

During this design step for single body distributors, particular components are added, either in the available spaces of the minimal distributor body defined during the first step, or at the periphery of the body of this minimal distributor, but without modifying the positions defined for the common components during the first step. If this condition cannot be respected, the design process is executed by successive iterations, for example by modifying the arrangement of the components or arranging them further from one another, in order to arrive at the desired result.

In the case of the three control circuits for three landing-gear systems of an airplane, given in FIGS. 3, 9 and 10, the common components are those used by the hydraulic control system of auxiliary front gear 8 whose circuit is that of FIG. 9.

These common components are:
gear selector 14*a* (with two stages)
principal hatch selector 14*b*;
valve 16*a* for the gear extension by gravity;
valve 15*a* for opening the trap-doors on the ground;
isolation valve 13;
non-return valves 181*a*, 181*c*, 181*d*, and 182*a*;
pressure detector 17*a*.

Figure 11A:
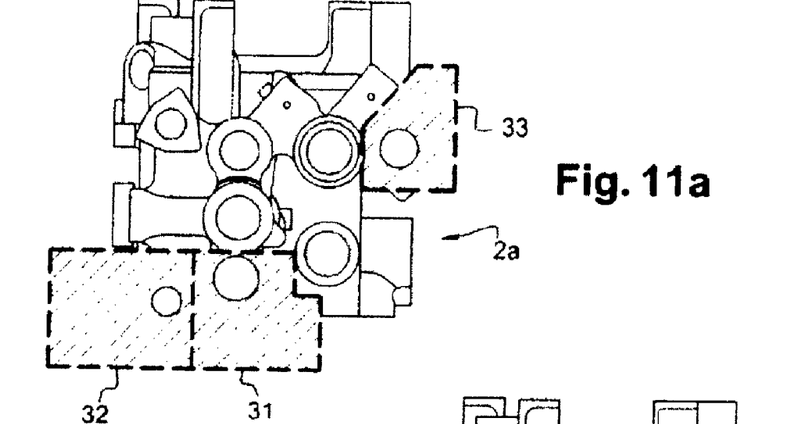
FIG. 11a, FIG. 11b, and FIG. 11c show views of the distributor bodies according to the invention in order to assure control of the different landing-gear systems of an airplane.

These components permit defining a minimal single-body distributor 2*a* presented in FIG. 11*a* and which, in this particular case, corresponds to the needs of the circuit of the front auxiliary landing-gear system 8 (the channels corresponding to hydraulic connections are not shown in this view).

The circuits of the other landing-gear systems 6 and 7 given in FIG. 3 and FIG. 10 permit establishing lists of specific components.

A first list of specific components is common to the two principal landing-gear systems 6 and 7 and comprises in this case:
valve 16*b* for the gear extension by gravity;
valve 15*b* for opening the trap-doors (left side if valve 15*a* is dedicated to the right side) on the ground;
non-return valves 181*e* and 182*b*.

Figure 11B:
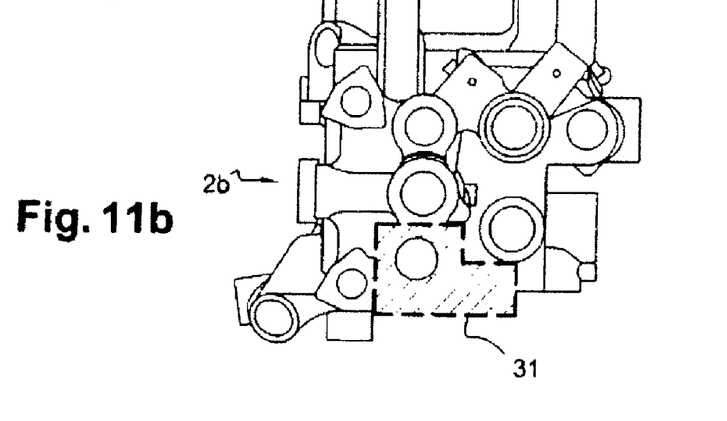

This list combined with the preceding list for the minimal distributor conduit, while respecting the definition of minimal distributor body 2*a* obtained from common components, [leads]* to an extended hydraulic distributor body 2*b* such as is shown in FIG. 11*b*. This distributor body 2*b* is obtained by bringing in zones 32 and 33 corresponding to the spaces used for the installation of specific components of the first list. In the example used, this extended single-body distributor corresponds to the needs of principal wing landing-gear system 6.

A second specific list is linked to principal fuselage landing-gear system 7 and comprises the components for operating secondary trap-doors 122a, 122b, which do not exist in the other landing-gear systems of the example:

secondary hatch selector 14c;

non-return valve 181b.

Figure 11C:
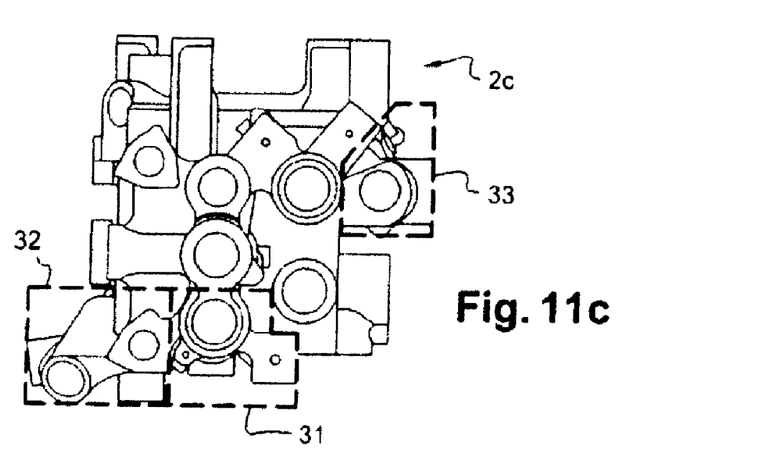

As in the preceding case, this second list combined with the preceding leads to another extended hydraulic distributor body 2c such as is shown in FIG. 11c. This distributor body 2c is obtained by adding zones 31, 32 and 33 onto minimal distributor body 2a, corresponding to the spaces used for the installation of specific components of the first and second lists, or by adding zone 31 onto body 2b, corresponding to the space used for the installation of specific components of the second list.

In order to create hydraulic control distributors according to the invention according to the option corresponding to the third choice given above, for all the landing-gear systems of an airplane, a body 2c is created (at least at the rough blank stage) corresponding to the most complete case and, depending on the destination of the hydraulic distributor to be created, i.e., for the landing-gear system for which it is designed, zone 31 or zones 31, 32, 33 of body 2c designed to receive all or part of the unused elements are removed, for example by machining of the blank or by creation of a modified blank in order to arrive at body 2b or 2a, respectively.

Such an approach has proven particularly realistic when the circuits considered, as shown in the present example, can be derived from one another by successive simplifications beginning from the most elaborate circuit (or successive increases in complexity by beginning with the simplest circuit), except some details, not considering the design of the body adapted to each landing-gear system.

Alternatively, the body is first made conforming to the simplest definition of minimal body 2a, and body elements 32 and 33 or 31, 32 and 33 are attached as a function of the landing-gear system for which the distributor is destined, to arrive at body 2b or 2c, respectively.

The different modes of adaptation of the body or distributor are optionally combined, advantageously in the case of the complex situation where circuits comprise specific parts that can be easily attached onto a body, where other parts can be easily eliminated as a function of the destination circuit, and where other parts can be neutralized because they are not easily attached or removed.

The invention claimed is:

1. A landing-gear system for an airplane comprising:

at least one leg for the landing gear that can be moved between two positions by means of a landing-gear leg two-way hydraulic actuator, and at least one trap-door that can be moved between two positions and driven by means of a trap-door two-way hydraulic actuator, wherein the two-way hydraulic actuators of the at least one landing gear and of the at least one trap-door are supplied with hydraulic fluid by a hydraulic distributor with a single body that has an assembly of hydraulic components that assure the supply of the two-way actuators for control of the movements of the at least one landing-gear leg and of the at least one trap-door and that comprises hydraulic connections between these components for the functioning of distributor, said assembly of hydraulic components comprising:

at least one selection valve for the control of at least one landing-gear leg two-way hydraulic actuator assuring the movements of the at least one landing-gear leg, at least one selection valve for the control of the at least one trap-door two-way hydraulic actuator assuring the movements of the at least one trap-door, at least one valve having a position in which chambers the at least one trap-door two-way actuator of the at least one trap-door are in communication, at least one valve having a position in which chambers of each of the two-way hydraulic actuators of the at least one landing gear leg and of the at least one trap-door are in communication.

2. The landing-gear system according to claim 1, wherein the single-body distributor also comprises an isolation valve that can prevent the intake of pressurized hydraulic fluid into the hydraulic components of the distributor and into the two-way hydraulic actuators which are controlled by said distributor.

3. The landing-gear system according to claim 1, wherein the single-body distributor comprises at least one first selection valve to assure the supply of at least one first actuator for at least one first trap-door articulated onto a fixed structure of the airplane and at least one second selection valve separate from the first selection valve in order to assure the supply of at least one second actuator for at least one second trap-door articulated onto the at least one first trap-door.

4. The landing-gear system according to claim 1, wherein each valve of the single body distributor is arranged in the single body distributor according to roughly parallel orientations.

5. The landing-gear system according to claim 1, in which the hydraulic connections between the hydraulic components of the single body distributor are formed by straight channels.

6. The landing-gear system according to claim 5, wherein the straight channels correspond to drillings or boreholes emerging at an outer surface of said single body distributor.

7. The landing-gear system according to claim 6, wherein holes corresponding to ends of the straight channels emerging at the outer surface of said single body distributor are sealed by attached elements when said holes do not correspond with an inlet or outlet channel for hydraulic fluid.

8. The landing-gear system according to claim 1, wherein the single body distributor comprises at least one two-stage selector whose two stages are integrated into the single body distributor.

9. The landing-gear system according to claim 1, in which at least one of the hydraulic components of the single body distributor uses mechanical control means attached to the single body distributor.

10. The landing-gear system according to claim 1, in which at least one of the hydraulic components of the single body distributor uses electric or electromagnetic control means or motors, attached to the single body distributor.

11. An airplane comprising at least two landing-gear systems, each landing-gear system comprising at least one landing-gear leg, that can be moved between two positions by means of a landing gear leg two-way hydraulic actuator and at least one trap-door that can be moved between two positions and driven by means of a second hydraulic actuator, characterized in that the first and second hydraulic actuators are supplied with hydraulic fluid by the single body hydraulic distributor of claim 1.

* * * * *

UNITED STATES PATENT AND TRADEMARK OFFICE
CERTIFICATE OF CORRECTION

| | | |
|---|---|---|
| PATENT NO. | : 7,810,755 B2 | Page 1 of 1 |
| APPLICATION NO. | : 11/689715 | |
| DATED | : October 12, 2010 | |
| INVENTOR(S) | : Didier Reynes | |

It is certified that error appears in the above-identified patent and that said Letters Patent is hereby corrected as shown below:

Title page, Col. 1, Below "(65) Prior Publication Data", insert -- (30) Foreign Application Priority Data Mar. 22, 2006 (FR) 2006-50993 --.

Column 12, line 5, Claim 1, before "the" insert -- of --.

Column 12, line 53, Claim 10, delete "motors ," and insert -- motors --, therefor.

Column 8, line 59, Claim 11, delete "actuator ," and insert -- actuator, --, therefor.

Signed and Sealed this
Twenty-second Day of February, 2011

David J. Kappos
*Director of the United States Patent and Trademark Office*